(12) United States Patent
Iverson, Jr. et al.

(10) Patent No.: US 9,090,354 B2
(45) Date of Patent: Jul. 28, 2015

(54) SYSTEM AND METHOD FOR IDENTIFYING A RECEIVING AIRCRAFT DURING AIRBORNE FUELING

(75) Inventors: Donald G. Iverson, Jr., Lake Saint Louis, MO (US); Eric P. Oman, Lake Saint Louis, MO (US); Paul D. Yeoman, O'Fallon, IL (US)

(73) Assignee: The Boeing Company, Chicago, IL (US)

( * ) Notice: Subject to any disclaimer, the term of this patent is extended or adjusted under 35 U.S.C. 154(b) by 1027 days.

(21) Appl. No.: 11/366,858

(22) Filed: Mar. 2, 2006

(65) Prior Publication Data
US 2007/0205328 A1 Sep. 6, 2007

(51) Int. Cl.
*B64D 39/00* (2006.01)
*B64D 39/06* (2006.01)

(52) U.S. Cl.
CPC ............... *B64D 39/00* (2013.01); *B64D 39/06* (2013.01)

(58) Field of Classification Search
USPC .................................. 244/135 R, 135 A, 136
See application file for complete search history.

(56) References Cited

U.S. PATENT DOCUMENTS

| | | | |
|---|---|---|---|
| 3,650,303 A | 3/1972 | Chambers et al. | |
| 5,906,336 A * | 5/1999 | Eckstein | 244/135 A |
| 6,085,805 A | 7/2000 | Bates | |
| 7,093,801 B2 * | 8/2006 | Schroeder | 244/135 A |
| 7,469,863 B1 * | 12/2008 | Speer | 244/135 A |
| 2005/0045768 A1 | 3/2005 | Saggio, III et al. | |
| 2005/0116109 A1 * | 6/2005 | Berard | 244/135 A |
| 2005/0253020 A1 | 11/2005 | McCoskey et al. | |
| 2005/0253021 A1 | 11/2005 | McCoskey | |
| 2006/0237591 A1 * | 10/2006 | McCoskey et al. | 244/135 R |
| 2006/0278761 A1 * | 12/2006 | Cutler et al. | 244/135 A |

OTHER PUBLICATIONS

PCT International Search Report re: PCT/US2007/004548; Nov. 9, 2007.
Written Opinion for International Application No. PCT/US2007/004548 dated Sep. 11, 2007.
Communication from corresponding European Application No. 07 751 317, dated Dec. 3, 2009.

* cited by examiner

*Primary Examiner* — Valentina Xavier
(74) *Attorney, Agent, or Firm* — Alston & Bird LLP

(57) ABSTRACT

A system for effecting automatic identifying of a receiving aircraft receiving fuel from a fuel delivery apparatus in a delivering aircraft during an airborne fueling operation includes: (a) a first unit coupled with the receiving aircraft; (b) a second unit coupled with the delivering aircraft; and (c) a processing unit coupled with at least one of the first unit and the second unit. The first and second units cooperate to effect communicative coupling for conveying identifying information between the receiving aircraft and the delivering aircraft. The processing unit cooperates with at least one of the first unit and the second unit for employing the identifying information to effect the identifying.

13 Claims, 7 Drawing Sheets

US 9,090,354 B2

SYSTEM AND METHOD FOR IDENTIFYING A RECEIVING AIRCRAFT DURING AIRBORNE FUELING

BACKGROUND OF THE INVENTION

The present invention is directed to airborne fueling of receiver aircraft, and especially to identification of receiver aircraft during fueling operations. During present in-flight or airborne fueling operations, the receiving aircraft may be visually identified by someone aboard the delivering aircraft. However, such visual identification is not always possible such as during night operations or during operations in conditions of low visibility. Moreover, visual identification does not always yield sufficient information, such as unit and serial number, to permit accurate billing for fuel delivered. It is, therefore, sometimes necessary that the tanker or delivering aircraft establish communications with the receiving aircraft to ascertain appropriate identifying information to effect correct billing for fuel delivered. The process of communicating to accomplish identification in the requisite detail to effect correct billing for fuel delivered is a distraction for crews of both aircraft involved in the fueling operation. Airborne fueling is a risky operation requiring strict attention by crews of both involved aircraft. Avoiding distractions, such as completing administrative tasks contributes to enhancing safety in airborne fueling operations. Also, there are times when radio communications are not permitted between aircraft, such as during times when electromagnetic silence is imposed for operational or other reasons.

There is a need for a system and method for identifying a receiving aircraft during airborne fueling. It would be particularly advantageous to achieve automatic identification of a receiving aircraft during airborne fueling. It would be further advantageous to achieve automatic recording of the amount of fuel provided to the receiving aircraft and automatic association of that fuel amount with the identification information relating to the receiving aircraft. It would be still further advantageous to achieve storing of information relating to identification of the receiving aircraft and amount of fuel provided in a format directly usable in required forms or reports employed in accounting for fuel transfers among aircraft.

SUMMARY OF THE INVENTION

A system for effecting automatic identifying of a receiving aircraft receiving fuel from a fuel delivery apparatus in a delivering aircraft during an airborne fueling operation includes: (a) a first unit coupled with the receiving aircraft; (b) a second unit coupled with the delivering aircraft; and (c) a processing unit coupled with at least one of the first unit and the second unit. The first and second units cooperate to effect communicative coupling for conveying identifying information between the receiving aircraft and the delivering aircraft. The processing unit cooperates with at least one of the first unit and the second unit for employing the identifying information to effect the identifying.

A method for effecting automatic identifying of a receiving aircraft receiving fuel from a fuel delivery apparatus in a delivering aircraft during an airborne fueling operation includes the steps of: (a) in no particular order: (1) Providing a first unit coupled with the receiving aircraft; (2) providing a second unit coupled with the delivering aircraft; and (3) providing a processing unit coupled with at least one of the first unit and the second unit. (b) Operating the first unit and the second unit cooperatively to effect communicative coupling for conveying identifying information between the receiving aircraft and the delivering aircraft. (c) Operating the processing unit cooperatively with at least one of the first unit and the second unit for employing the identifying information to effect the identifying.

It is, therefore, a feature of the present invention to provide a system and method for identifying a receiving aircraft during airborne fueling.

It is a further feature of the present invention to provide a system and method for identifying a receiving aircraft during airborne fueling that is capable of effecting automatic identification of a receiving aircraft during airborne fueling.

It is yet a further feature of the present invention to provide a system and method for identifying a receiving aircraft during airborne fueling that is capable of effecting automatic recording of the amount of fuel provided to the receiving aircraft.

It is still a further feature of the present invention to provide a system and method for identifying a receiving aircraft during airborne fueling that is capable of automatic association of the transferred fuel amount with identification information relating to the receiving aircraft.

It is a further feature of the present invention to provide a system and method for identifying a receiving aircraft during airborne fueling that is capable of storing information relating to identification of the receiving aircraft and amount of fuel for use in a format for required forms or reports employed in accounting for fuel transfers among aircraft.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume or a portion of any of those features. A locus in an electrical apparatus may include, by way of example and not by way of limitation, a terminal, wire, circuit, circuit trace, circuit board, wiring board, pin, connector, component, collection of components, sub-component or other identifiable location-related area in one or more dimensions. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

Figure 1:
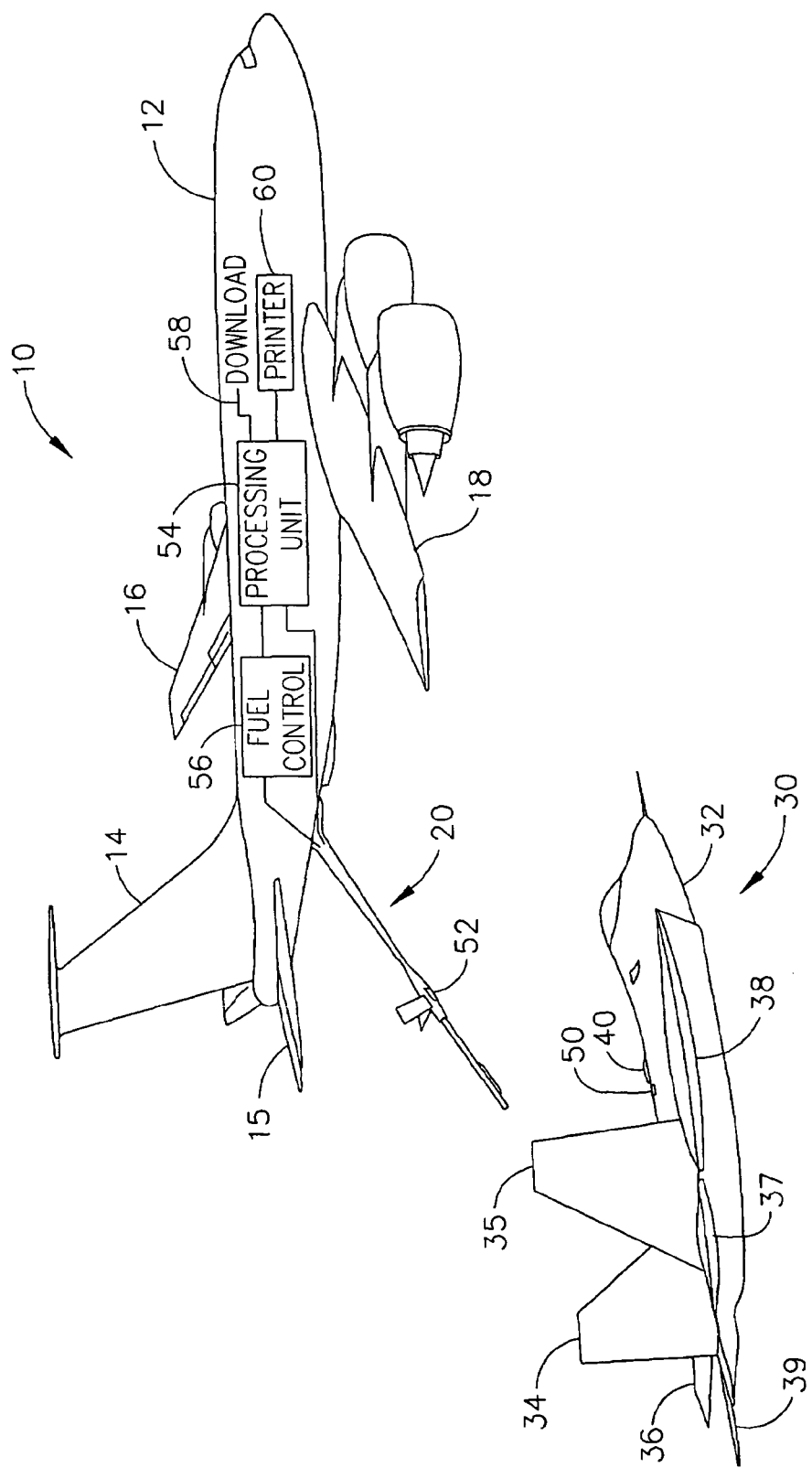
FIG. 1 is a schematic diagram illustrating a receiving aircraft approaching a delivering aircraft for airborne fueling using a boom-type fueling apparatus.

FIG. 1 is a schematic diagram illustrating a receiving aircraft approaching a delivering aircraft for airborne fueling using a boom-type fueling apparatus. In FIG. 1, a tanker or delivering aircraft 10 includes a fuselage 12, a tail or vertical stabilizer 14 attached with fuselage 12, wings 16, 18 and a fueling boom 20. A single right or starboard horizontal stabilizer 15 is visible in FIG. 1; a similar left or port horizontal stabilizer is not visible behind fuselage 12 and vertical stabilizer 14. Fueling boom 20 is in an extended position for fueling operations. Fueling boom 20 may be stowed adjacent fuselage 12 or within fuselage 12 (not shown in FIG. 1) when delivering aircraft 10 is not engaged in fueling operations.

A receiving aircraft 30 includes a fuselage 32, two tails or vertical stabilizers 34, 35 attached with fuselage 32, wings 36, 38 and a fuel receiving structure 40. A single right or starboard horizontal stabilizer 39 is visible in FIG. 1. A similar left or port horizontal stabilizer is not visible in FIG. 1 behind fuselage 32 and vertical stabilizers 34, 35.

During an airborne fueling operation, delivering aircraft 10 is usually flown at a predetermined altitude, course and speed. Receiving aircraft 30 is maneuvered to effect coupling between fueling boom 20 and fuel receiving structure 40 so that fuel may be delivered via fueling boom 20 via fuel receiving structure 40 to fuel tanks (not shown in FIG. 1) located within receiving aircraft 30 in fluid communication with fuel receiving structure 40.

Identifying markings may be displayed on receiving aircraft 30 in such locations as fuselage 32, vertical stabilizers 34, 35, or wings 36, 38. However, the relative position of receiving aircraft 30 with respect to delivering aircraft 10 during airborne fueling operations, behind and below delivering aircraft 10, makes it difficult for an observer aboard delivering aircraft 10 to read such markings. Receiving aircraft 30 may execute a fly-by past delivering aircraft 10 to permit easier reading of identifying markings on receiving aircraft 30. However, such a fly-by maneuver involves additional close-aboard flying, uses precious fuel and requires additional time. Close proximity flying, or close-aboard flying required for carrying out fueling operations between delivering aircraft 10 and receiving aircraft 30 is risky. Further, both aircraft 10, 30 are vulnerable to attack with little capability to maneuver during airborne fueling. Consequently, airborne fueling is preferably carried out as expeditiously as can be accomplished with as little close-aboard flying as possible.

The system of the present invention includes at least one identifying indicia 50 affixed with receiving aircraft 30, an identification recognizing unit 52 affixed with delivering aircraft 10 and a processing unit 54. Connection between identification recognizing unit 52 and processing unit 54 is not explicitly shown in FIG. 1 only to avoid cluttering FIG. 1. It is preferred that processing unit 54 is located with delivering aircraft 10. Processing unit 54 may be located with receiving aircraft 30 if desired. If processing unit 54 is located with receiving aircraft 30, communication may be provided between aircraft 10, 30 by a communication hookup established when aircraft 10, 30 are coupled together in a fueling orientation as described elsewhere herein.

Processing unit 54 is preferably coupled with fuel delivery apparatus aboard delivering aircraft 10 as by coupling with a fuel control unit 56. Processing unit 54 may alternatively be coupled with fuel delivery apparatus by another connection, such as by connection with a fluid flow meter in the fuel delivery system (not shown in FIG. 1) that delivers fuel to receiving aircraft 30 via fueling boom 20. The fluid flow meter may be located in either of aircraft 10, 30. Processing unit 54 may be coupled with a printer 60 for on-board preparation of paperwork (by way of example and not by way of limitation, a DoD Form 791; Department of Defense form accounting for fuel transfers) memorializing a fueling operation with receiving aircraft 30. Preferably the paperwork identifies receiving aircraft 30 and the amount of fuel provided to receiving aircraft 30. Processing unit 54 may as well be equipped with a port 58 for downloading information relating to a fueling operation with receiving aircraft 30 for later transfer, later transmission or later printing. Later printing may be carried out on-board delivering aircraft 10 or elsewhere.

Identification recognizing unit 52 is situated at delivering aircraft 10 appropriately to permit receiving identifying information from identifying indicia 50 during an airborne fueling operation involving receiving aircraft 30 and delivering aircraft 10. Receipt of identifying information from receiving aircraft 30 may occur at any time during an airborne fueling operation including during approach by receiving aircraft 30 toward delivering aircraft 10, during fueling while receiving aircraft 30 is coupled with delivering aircraft 10 by fueling boom 20 or during break-away and departure by receiving aircraft 30 from delivering aircraft 10 after fueling is completed. It is preferred that identification recognizing unit 52 and identifying indicia 50 be situated to permit receiving identifying information from identifying indicia 50 while receiving aircraft 30 is coupled with delivering aircraft 10 by fueling boom 20. It is during this flight orientation that the relative positions of aircraft 10, 30 are most predictable, most stable and closest together. A close and stable relative position contributes to more reliable sharing of identifying information between aircraft 10, 30.

Identifying indicia 50 and identity recognizing unit 52 may employ any one or more of several technologies in effecting sharing of identity information between aircraft 10, 30. More than one identifying indicia 50 may be affixed to receiving aircraft 30 (not shown in FIG. 1). Identity recognizing unit 52 may be one or more units employing one or more technology for effecting identity recognition. Using more than one identifying indicia 50 or more than one identity recognizing units 52 may increase likelihood of communicating identity information between aircraft 10, 30. By way of example and not by way of limitation, identifying indicia 50 and identity recognizing unit 52 may employ one or more of thermally readable coding, inductively readable coding, capacitively readable coding, magnetically readable coding or coding readable by another measurable parameter. By way of further example and not by way of limitation, identifying indicia 50 and identity recognizing unit 52 may employ optically readable coding, such as may be embodied in a bar code system. Such a bar code system may be arranged in a one-dimensional, two-dimensional or other arrangement recognizable by an identity recognizing unit 52 embodied in an appropriate bar code reader unit. It is preferred that technology employed for identifying indicia 50 and identity recognizing unit 52 be passive or emit low level signals so that the identification may be effected during periods when electromagnetic emissions are limited or forbidden, as during electromagnetic-silence conditions sometimes observed by aircraft in hostile environments.

By way of example and not by way of limitation, identifying indicia 50 may be embodied in a tag affixed to fuselage 32, may be inherently included in paint applied to aircraft 30, may be etched in a surface of receiving aircraft 30, may be mounted within receiving aircraft 30, or may be otherwise affixed with or incorporated in receiving aircraft 30. An identifying indicium 50 may be embodied in a tag 50 located within fuel receiving structure 40. Fuel receiving structure 40 is sometimes configured to close when receiving aircraft 30 is not engaged in airborne fueling so that fuselage 32 can present a more aerodynamic profile than is presented during airborne fueling. Locating a tag 50 within fuel receiving structure 40 exposes tag 50 for interrogation by identity recognizing unit 52 during airborne fueling when fuel receiving structure 40 is open while situating tag 50 in a protected environment during other maneuvers when fuel receiving structure 40 is closed. Alternatively, a tag 50 may be simply covered by a protective coating after being affixed with receiving aircraft 30 (not shown in detail in FIG. 1).

A preferred embodiment of identifying indicia 50 is an RFID (Radio Frequency IDentification) tag 50. Some other technologies that may be employed for identification indicia 50 are limited in their effectiveness. For example, thermally coded systems may be limited in their effective range and may be adversely affected by cold weather as well as by dirt or other deposits atop identifying indicia 50. Optically coded systems may also be limited in their effective range and may be adversely affected by low visibility or dirt or other deposits upon identifying indicia 50. Further, placement of elements comprising an optically encoded system is sometimes difficult because optically encoded systems are limited to line-of-sight between identifying indicia 50 and identity recognizing unit 52 for effective recognition of coded information.

An identifying indicia embodied in an REFD tag 50 permits locating identity recognizing unit 52 up to approximately one meter from RFID tag 50. No line-of-sight is required between RFID tag 50 and identity recognizing unit 52. Dirt or other deposits over RFID tag 50 do not seriously impair electromagnetic communication between RFID tag 50 and identity recognizing unit 52. RFID tag 50 is inexpensive and unobtrusive. That is, RFID tag 50 may be embodied in a simple adhesive tag that may be affixed within fuel receiving structure 40, on fuselage 32 or elsewhere with ease and without significantly affecting performance of receiving aircraft 30. RFID tag 50 emits low level RF (Radio Frequency) signals in response to low level interrogation RF signals from identity recognizing unit 52. The signals traded between RFID tag 50 and identity recognizing unit 52 for sharing identification information by aircraft 10, 30 are of short duration. Such short duration, low-level signals are unlikely to be detected by a hostile entity.

Figure 2:
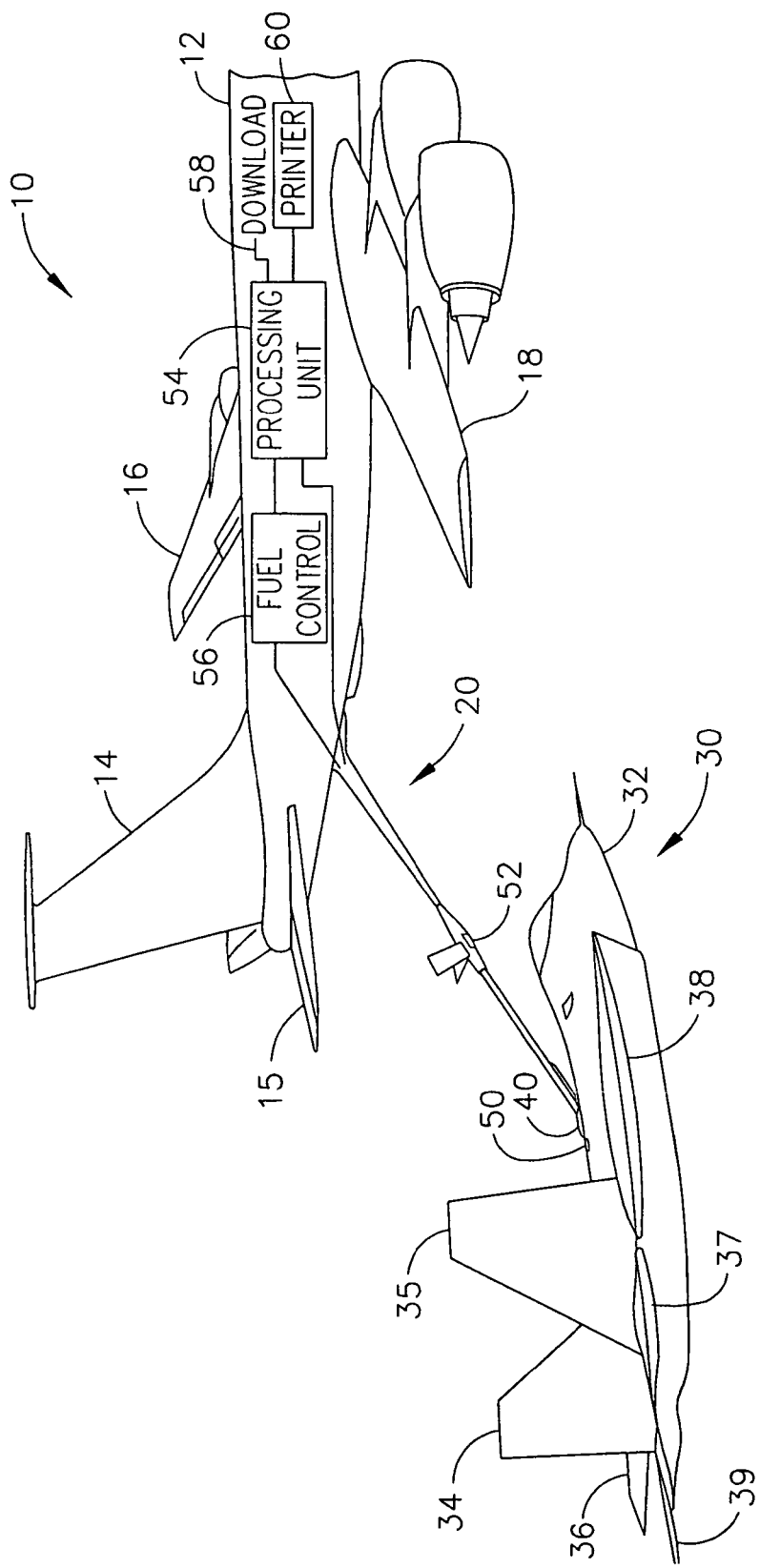
FIG. 2 is a schematic diagram illustrating a receiving aircraft substantially in a fueling-coupled relation with a delivering aircraft for airborne fueling using a boom-type fueling apparatus.

FIG. 2 is a schematic diagram illustrating a receiving aircraft substantially in a fueling-coupled relation with a delivering aircraft for airborne fueling using a boom-type fueling apparatus. In FIG. 2, a tanker or delivering aircraft 10 configured substantially as described in connection with FIG. 1 includes a fueling boom 20 in an extended position for fueling operations. A receiving aircraft 30 configured substantially as described in connection with FIG. 1 is situated to effect coupling between fueling boom 20 and fuel receiving structure 40 so that fuel may be delivered via fueling boom 20 via fuel receiving structure 40 to fuel tanks (not shown in FIG. 2) located within receiving aircraft 30 in fluid communication with fuel receiving structure 40.

An identifying indicium 50 is affixed with receiving aircraft 30 generally adjacent to fuel receiving structure 40. An identification recognizing unit 52 is affixed with fueling boom 20 substantially distal from delivering aircraft 10. Connection between identification processing unit 52 and processing unit 54 is not explicitly shown in FIG. 2 only to avoid cluttering FIG. 2. Processing unit 54 is coupled with fuel delivery apparatus aboard delivering aircraft 10 as by coupling with a fuel control unit 56 or by another connection, such as by connection with a fluid flow meter in the fuel delivery system (not shown in FIG. 2) that delivers fuel to receiving aircraft 30 via fueling boom 20. Processing unit 54 may be coupled with a printer 60 (see FIG. 1) for on-board preparation of paperwork. Processing unit 54 may also be equipped with a port 58 for downloading information relating to a fueling operation with receiving aircraft 30 for later transfer, later transmission or later printing, whether on-board delivering aircraft 10 or elsewhere.

Identification recognizing unit 52 is situated at delivering aircraft 10 appropriately to permit receiving identifying information from identifying indicium 50 during an airborne fueling operation involving receiving aircraft 30 and delivering aircraft 10. When identifying indicium 50 is embodied in a preferred RFID tag 50 (as in FIG. 2), identification recognizing unit 52 is preferably situated within RF communication range of RFID tag 50 to achieve communication coupling between identification recognizing unit 52 and RFID tag 50 during fueling while receiving aircraft 30 is coupled with delivering aircraft 10 by fueling boom 20. It is during this coupled-for-fueling flight orientation that the relative positions of aircraft 10, 30 are most predictable, most stable and closest together. A close and stable relative position contributes to more reliable sharing of identifying information between aircraft 10, 30.

Identifying indicia 50 may be embodied in a tag affixed to fuselage 32 located adjacent to fuel receiving structure 40, as illustrated in FIG. 2. Alternatively, identifying indicia 50 may be embodied in a tag located within fuel receiving structure 40. Fuel receiving structure 40 is sometimes configured to close when receiving aircraft 30 is not engaged in airborne fueling so that fuselage 32 can present a more aerodynamic profile than is presented during airborne fueling. Locating tag 50 within fuel receiving structure 40 exposes tag 50 for communication with identity recognizing unit 52 when fuel receiving structure 40 is open during airborne fueling. Tag 50 is in a protected environment during other maneuvers when fuel receiving structure 40 is closed. Tag 50 may be simply covered by a protective coating after being affixed with receiving aircraft 30 (not shown in FIG. 2).

Figure 3:
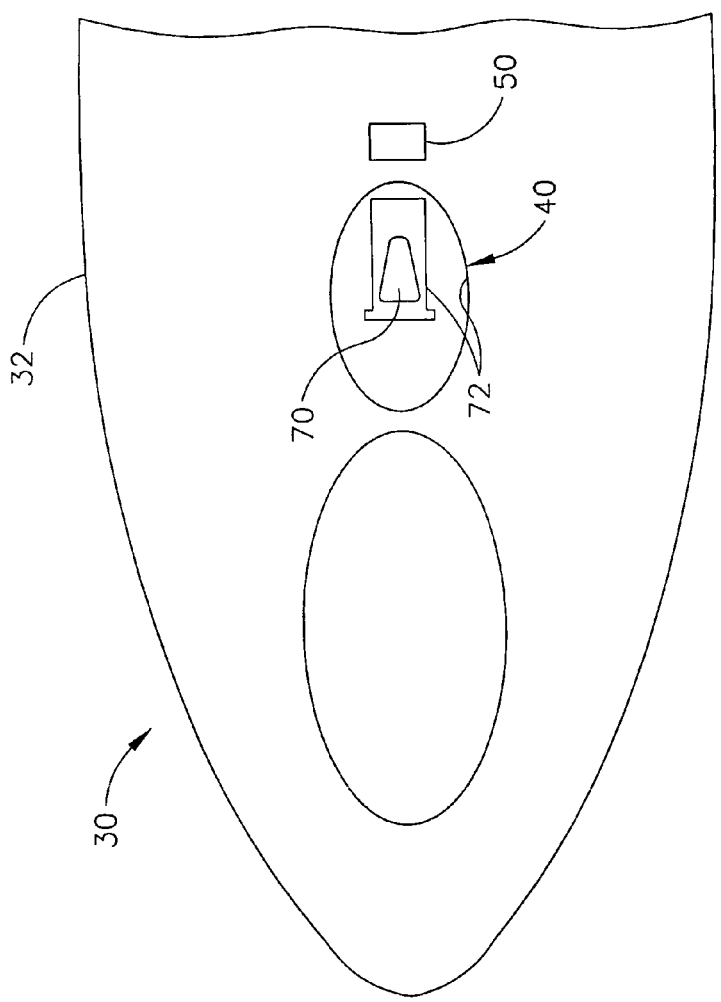
FIG. 3 is a schematic diagram illustrating a receiving structure on a receiving aircraft for use in establishing a fueling-coupled relation with a delivering aircraft for airborne fueling using a boom-type fueling apparatus.

FIG. 3 is a schematic diagram illustrating a receiving structure on a receiving aircraft for use in establishing a fueling-coupled relation with a delivering aircraft for airborne fueling using a boom-type fueling apparatus. In FIG. 3, a fuselage 32 of a receiving aircraft 30 includes a fuel receiving structure 40. An identifying indicia embodied in an RFID tag 50 is affixed to fuselage 32 substantially adjacent to fuel receiving structure 40. Fuel receiving structure 40 includes an intake aperture 70 into which fueling boom 20 is inserted (see FIG. 2) during fueling operations. Intake aperture 70 is in fluid communication with fuel tanks situated within fuselage 32 (not shown in FIG. 3). Substantially surrounding intake aperture 70 is a guiding structure 72. Guiding structure 72 is configured to assist in guiding fueling boom 20 into proper position for transferring fuel into intake aperture 70 during fueling operations. Preferred configurations of guiding structure 72 are embodied in contoured surfaces for receiving fueling boom 20 within intake aperture 70 as receiving aircraft 30 approaches delivering aircraft 10 (FIGS. 1 and 2) from below and behind or aft of delivering aircraft 10, generally as illustrated in FIGS. 1 and 2. Guiding structure 72 may alternatively or additionally include generally planar structures extending generally perpendicular from fuselage 32 behind or aft of intake aperture 70 (not shown in detail in FIG. 3) to guide fueling boom into intake aperture 70 during airborne fueling.

Figure 4:
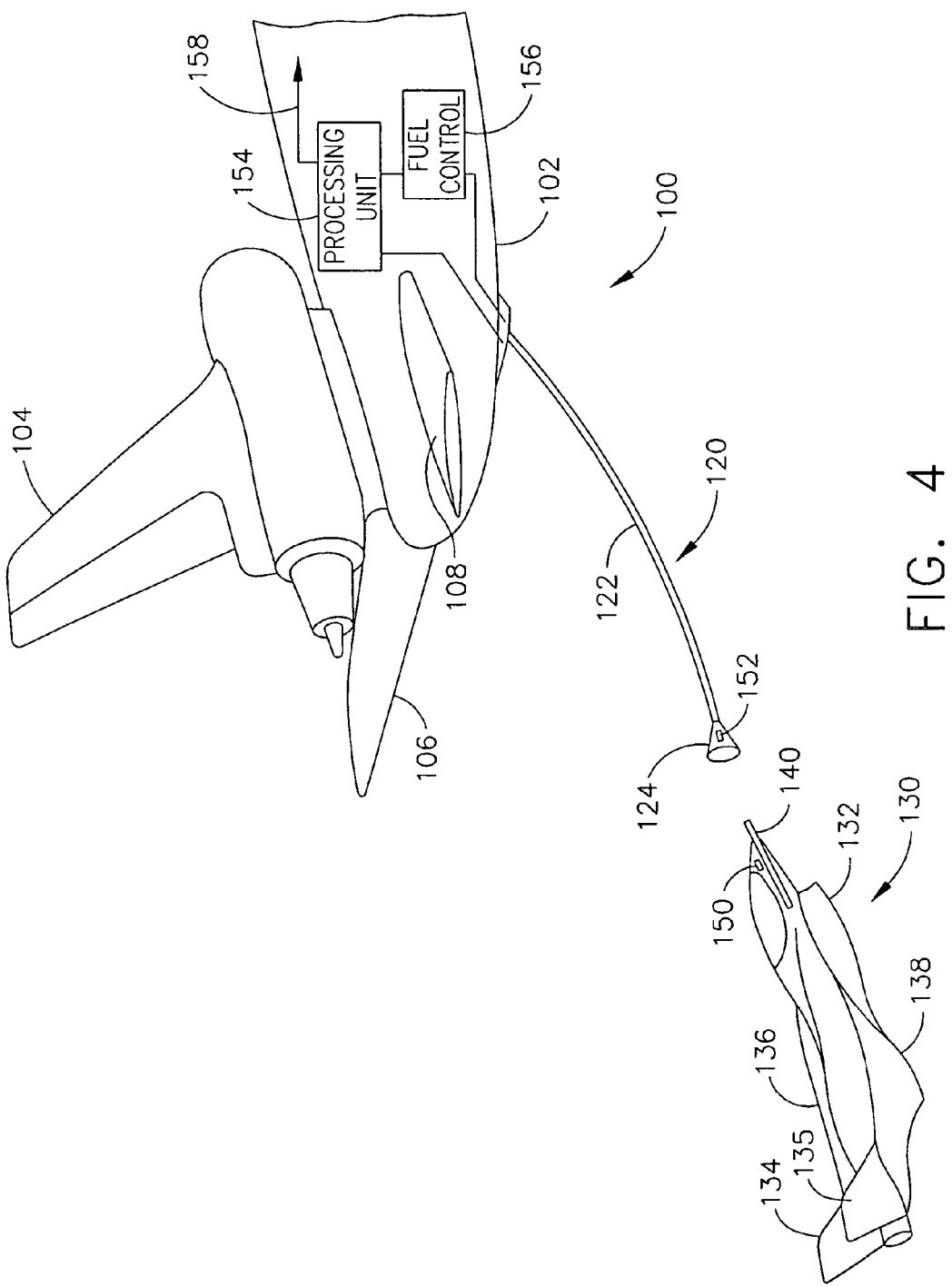
FIG. 4 is a schematic diagram illustrating a receiving aircraft approaching a delivering aircraft for airborne fueling using a probe-and-drogue-type fueling apparatus.

FIG. 4 is a schematic diagram illustrating a receiving aircraft approaching a delivering aircraft for airborne fueling using a probe-and-drogue-type fueling apparatus. In FIG. 4, a rear or aft portion of a tanker or delivering aircraft 100 is illustrated including a fuselage 102, a tail or vertical stabilizer 104 attached with fuselage 102, horizontal stabilizers 106, 108 and a fueling unit 120. Fueling unit 120 includes a trailing delivery hose 122 coupled with delivering aircraft 10 and a drogue coupler 124 coupled with delivery hose 122. In FIG. 4, fueling unit 120 is in an extended position for fueling operations. Fueling unit 120 may be stowed adjacent fuselage 102 or within fuselage 102 (not shown in FIG. 4) when delivering aircraft 10 is not engaged in fueling operations.

A receiving aircraft 130 includes a fuselage 132, vertical stabilizers 134, 135 attached with fuselage 132, wings 136, 138 and a fuel receiving probe structure 140. During an airborne fueling operation, delivering aircraft 100 is usually flown at a predetermined altitude, course and speed. Receiving aircraft 130 is maneuvered to effect coupling between drogue coupler 124 and fuel receiving probe 140 so that fuel may be delivered via fueling delivery hose 122, via drogue coupler 124 and via fuel receiving probe 140 to fuel tanks (not shown in FIG. 4) located within receiving aircraft 130 in fluid communication with fuel receiving probe 140.

Identifying markings may be displayed on receiving aircraft 130 in such locations as fuselage 132, vertical stabilizer 134, or wings 136, 138. However, the relative position of receiving aircraft 130 with respect to delivering aircraft 100 during airborne fueling operations, behind and below delivering aircraft 100, makes it difficult for an observer aboard delivering aircraft 100 to read such markings. Receiving aircraft 130 may execute a fly-by past delivering aircraft 100 to permit easier reading of identifying markings on receiving aircraft 130. However, such a fly-by maneuver involves additional close-aboard flying, uses precious fuel and requires additional time. Close proximity flying, or close-aboard flying required for carrying out fueling operations between delivering aircraft 100 and receiving aircraft 130 is risky. Further, both aircraft 100, 130 are vulnerable to attack with little capability to maneuver during airborne fueling. Consequently, airborne fueling is preferably carried out as expeditiously as can be accomplished with as little close-aboard flying as possible.

The system of the present invention includes at least one identifying indicia 150 affixed with receiving aircraft 130, an identification recognizing unit 152 affixed with delivering aircraft 100 and a processing unit 154. Connection between identification recognizing unit 152 and processing unit 154 is not explicitly shown in FIG. 4 only to avoid cluttering FIG. 4. It is preferred that processing unit 154 is located with delivering aircraft 100. Processing unit 154 is coupled with fuel delivery apparatus aboard delivering aircraft 100 as by coupling with a fuel control unit 156 or by another connection, such as by connection with a fluid flow meter in the fuel delivery system (not shown in FIG. 4) that delivers fuel to receiving aircraft 130 via fueling delivery hose 122 and drogue coupler 124. Processing unit 154 may be equipped with a port 158 for downloading information relating to a fueling operation with receiving aircraft 130 for printing on board, for later transfer, for later transmission or for later printing, whether on-board delivering aircraft 100 or elsewhere. Printing is anticipated to be a desired function of the system for preparation of paperwork (by way of example and not by way of limitation, a DoD Form 791; Department of Defense form accounting for fuel transfers) memorializing a fueling operation with receiving aircraft 130, identifying receiving aircraft 130 and the amount of fuel provided to receiving aircraft 130.

Identification recognizing unit 152 is situated at delivering aircraft 100 appropriately to permit receiving identifying information from identifying indicia 150 during an airborne fueling operation involving receiving aircraft 130 and delivering aircraft 100. Receipt of identifying information may occur at any time during an airborne fueling operation including during approach by receiving aircraft 130 toward delivering aircraft 100, during fueling while receiving aircraft 130 is coupled with delivering aircraft 100 by fueling unit 120 or during break-away and departure by receiving aircraft 130 from delivering aircraft 100 after completion of fueling. It is preferred that identification recognizing unit 152 and identifying indicia 150 be situated to permit receiving identifying information from identifying indicia 150 while receiving aircraft 130 is coupled with delivering aircraft 100 by fueling unit 20. It is during this coupled-for-fueling flight orientation that the relative positions of aircraft 100, 130 are most predictable, most stable and closest together. A close and stable relative position contributes to more reliable sharing of identifying information between aircraft 100, 130.

Identifying indicia 150 and identity recognizing unit 152 may employ any one or more of several technologies in effecting sharing of identity information between aircraft 100, 130. More than one identifying indicia 150 may be affixed to receiving aircraft 130 (not shown in FIG. 4). Identity recognizing unit 152 may be one or more units employing one or more technology for effecting identity recognition. Using more than one identifying indicia 150 or more than one identity recognizing units 152 may increase likelihood of communicating identity information between aircraft 100, 130. By way of example and not by way of limitation, identifying indicia 150 and identity recognizing unit 152 may employ one or more of thermally readable coding, inductively readable coding, capacitively readable coding, magnetically readable coding or coding readable by another measurable parameter. By way of further example and not by way of limitation, identifying indicia 150 and identity recognizing unit 152 may employ optically readable coding, such as may be embodied in a bar code system. Such a bar code system may be arranged in a one-dimensional, two-dimensional or other arrangement recognizable by an identity recognizing unit 152 embodied in an appropriate bar code reader unit. It is preferred that technology employed for identifying indicia 150 and identity recognizing unit 152 be passive or emit low level signals so that the identification may be effected during periods when electromagnetic emissions are limited or forbidden, as during radio-silence conditions sometimes observed by aircraft in hostile environments.

Identifying indicia 150 may be embodied in a tag affixed to fuselage 132, may be inherently included in paint applied to aircraft 130, may be etched in a surface of receiving aircraft 130, may be mounted within receiving aircraft 130, or may be otherwise affixed with or incorporated in receiving aircraft 130. An identifying indicium 150 may be embodied in a tag 150 located near, on or within fuel receiving probe 140. Fuel receiving probe 140 is sometimes configured to close or be retracted within receiving aircraft 130 when receiving aircraft 130 is not engaged in airborne fueling so that fuselage 132 can present a more aerodynamic profile than is presented during an airborne fueling operation. Locating tag 150 near, on or within fuel receiving probe 140 exposes tag 150 for interrogation by identity recognizing unit 152 during airborne fueling when fuel receiving probe 140 is deployed while situating tag 150 in a protected environment during other maneuvers when fuel receiving probe 140 is in a stored orientation for flight operations other than fueling operations. A tag 150 may be simply covered by a protective coating after being affixed with receiving aircraft 130 (not shown in detail in FIG. 4).

A preferred embodiment of identifying indicia 150 is an RFID (Radio Frequency IDentification) tag 150. Some other technologies that may be employed for identification indicia 150 are limited in their effectiveness. For example, thermally coded systems may be limited in their effective range and may be adversely affected by cold weather as well as by dirt or other deposits atop identifying indicia 150. Optically coded systems may also be limited in their effective range and may be adversely affected by low visibility or dirt or other deposits atop identifying indicia 150. Further, placement of elements comprising an optically encoded system is sometimes difficult because optically encoded systems are limited to line-of-sight between identifying indicia 150 and identity recognizing unit 152 for effective recognition of coded information.

An identifying indicia embodied in an RIFD tag 150 permits locating identity recognizing unit 152 up to approximately one meter from RFID tag 150. No line-of-sight is required between identifying indicia-RFID tag 150 and identity recognizing unit 152. Dirt or other deposits over RFID tag 150 do not seriously impair electromagnetic communication between RFID tag 150 and identity recognizing unit 152. RFID tag 150 is inexpensive and unobtrusive. That is, RFID tag 150 may be embodied in a simple adhesive tag that may be affixed near, on or within fuel receiving probe 140, on fuselage 132 or elsewhere with ease and without significantly affecting performance of receiving aircraft 130. RFID tag 150 emits low level RF (Radio Frequency) signals in response to low level interrogation RF signals from identity recognizing unit 152. The signals traded between RFID tag 150 and identity recognizing unit 152 for sharing identification information by aircraft 100, 130 are of short duration. Such short duration, low-level signals are unlikely to be detected by a hostile entity.

Figure 5:
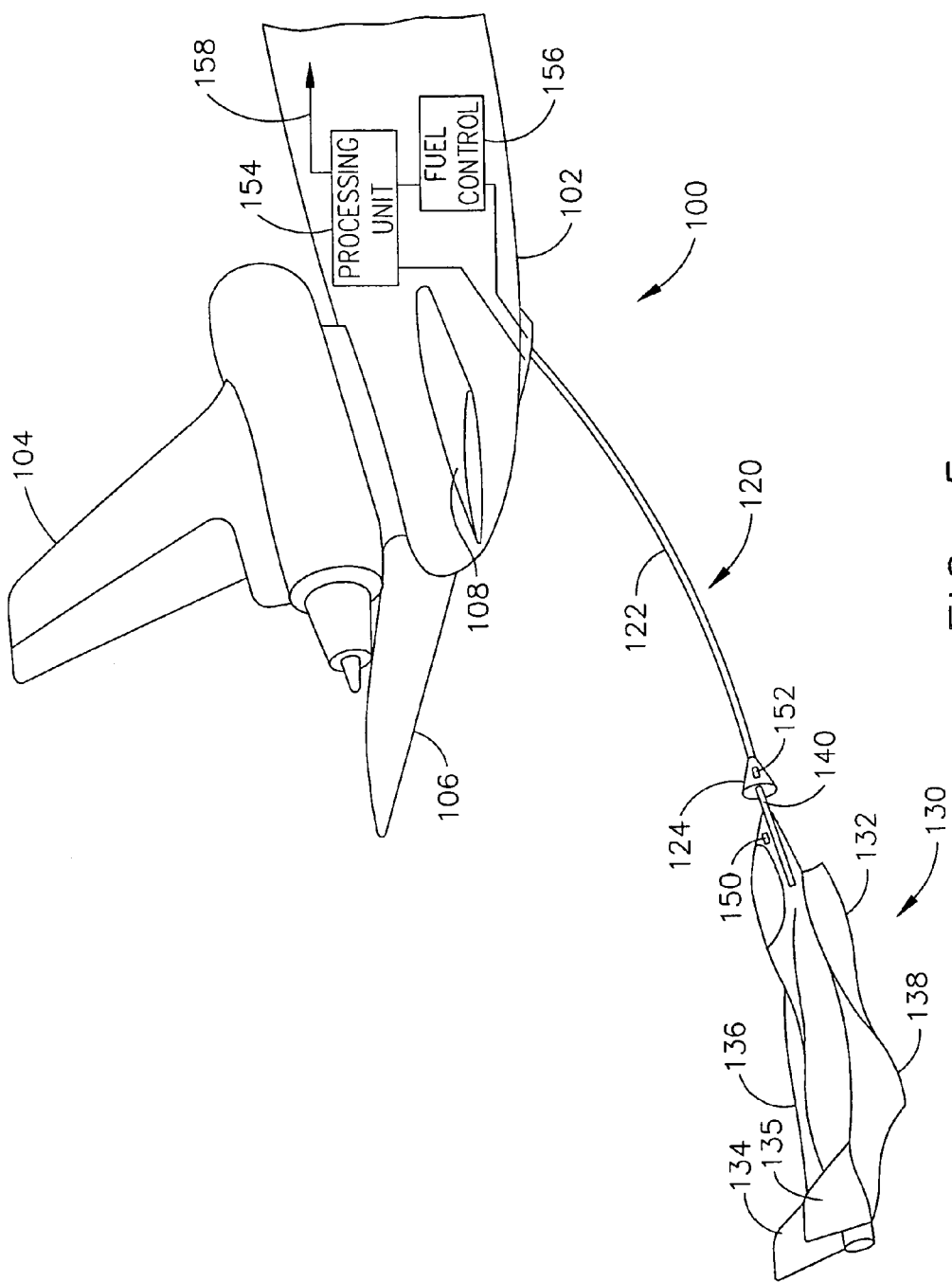
FIG. 5 is a schematic diagram illustrating a receiving aircraft substantially in a fueling-coupled relation with a delivering aircraft for airborne fueling using a probe-and-drogue-type fueling apparatus.

FIG. 5 is a schematic diagram illustrating a receiving aircraft substantially in a fueling-coupled relation with a delivering aircraft for airborne fueling using a probe-and-drogue-type fueling apparatus. In FIG. 5, a tanker or delivering aircraft 100 configured substantially as described in connection with FIG. 4 includes a fueling unit 120 comprising a delivery hose 122 and an attached drogue coupler 124 in an extended position for fueling operations. A receiving aircraft 130 configured substantially as described in connection with FIG. 4 is situated to effect coupling between drogue coupler 120 and fuel receiving probe 140 so that fuel may be delivered via fueling unit 120 and fuel receiving probe 140 to fuel tanks (not shown in FIG. 5) located within receiving aircraft 130 in fluid communication with fuel receiving probe 140.

An identifying indicium 150 is affixed with receiving aircraft 130 and an identification recognizing unit 152 is affixed with fueling unit 120, preferably at drogue coupler 124, as illustrated in FIGS. 4 and 5. Connection between identification processing unit 152 and processing unit 154 is not explicitly shown in FIG. 5 only to avoid cluttering FIG. 5. Processing unit 154 is coupled with fuel delivery apparatus aboard delivering aircraft 100 as by coupling with a fuel control unit 156 or by another connection, such as by connection with a fluid flow meter in the fuel delivery system (not shown in FIG. 5) that delivers fuel to receiving aircraft 130 via fueling unit 120. Processing unit 154 may be equipped with a port 158 for downloading information relating to a fueling operation with receiving aircraft 130 for printing paperwork on board, for later transfer, for later transmission or for later printing, whether on-board delivering aircraft 100 or elsewhere.

Identification recognizing unit 152 is situated at delivering aircraft 100 appropriately to permit receiving identifying information from identifying indicium 150 during an airborne fueling operation involving receiving aircraft 130 and delivering aircraft 100. When identifying indicium 150 is embodied in a preferred RFID tag 150 (as in FIG. 5), identification recognizing unit 152 is preferably situated within RF communication range of RFID tag 150, or approximately one meter to achieve communication coupling between identification recognizing unit 152 and RIFD tag 150 during fueling while receiving aircraft 130 is coupled with delivering aircraft 100 by fueling unit 120. It is during this coupled-for-fueling flight orientation that the relative positions of aircraft 100, 130 are most predictable, most stable and closest together. A close and stable relative position contributes to more reliable sharing of identifying information between aircraft 100, 130.

Identifying indicia 150 may be embodied in a tag affixed to fuselage 132 located adjacent to fuel receiving probe 140, as illustrated in FIG. 5. Alternatively, identifying indicia 150 may be embodied in a tag located within fuel receiving probe 140. Fuel receiving structure 140 is sometimes configured to withdraw into a cavity (not shown in FIG. 5; see FIG. 6) when receiving aircraft 130 is not engaged in airborne fueling so that fuselage 132 can present a more aerodynamic profile than is presented during airborne fueling. Locating tag 150 within fuel receiving probe 40 or within a cavity into which fuel receiving probe withdraws exposes tag 150 for communication with identity recognizing unit 152 when fuel receiving probe 40 is deployed during airborne fueling. Tag 150 is in a protected environment within the cavity into which fuel receiving probe 140 is withdrawn during other maneuvers. Tag 150 may be simply covered by a protective coating after being affixed with receiving aircraft 130 (not shown in FIG. 5).

Figure 6:
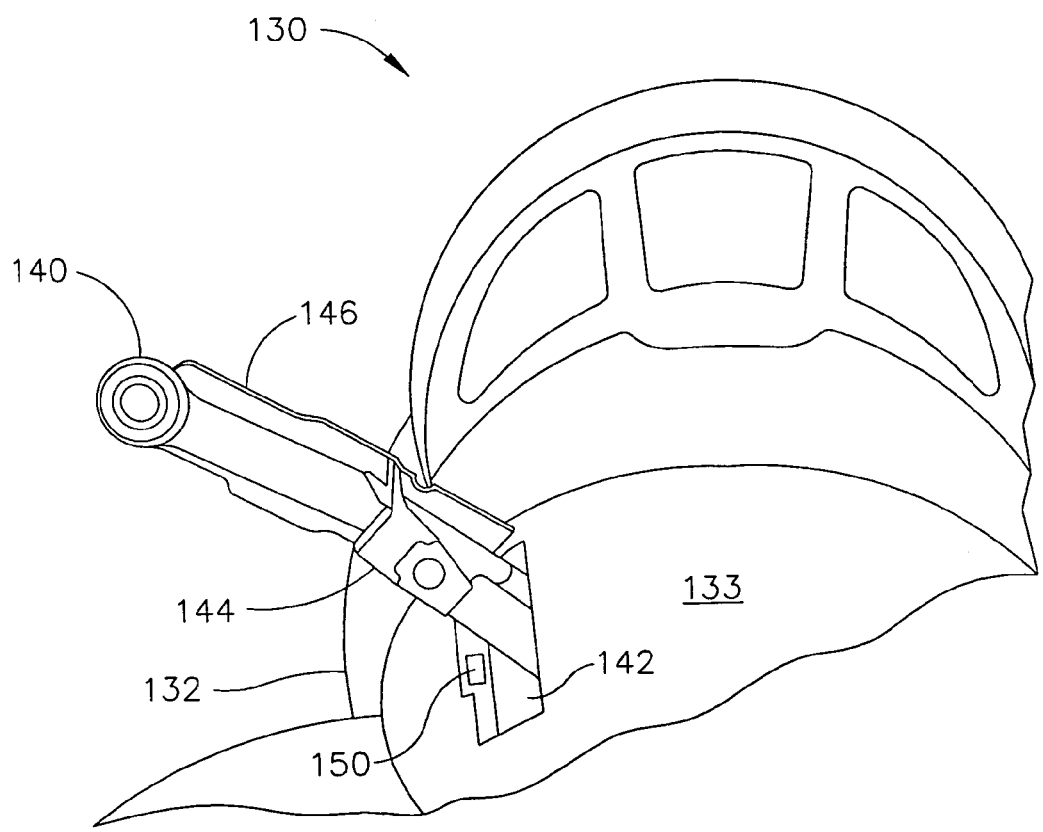
FIG. 6 is a schematic diagram illustrating a probe structure for use in establishing a fueling-coupled relation with a delivering aircraft for airborne fueling using a probe-and-drogue-type fueling apparatus.

FIG. 6 is a schematic diagram illustrating a probe structure for use in establishing a fueling-coupled relation with a delivering aircraft for airborne fueling using a probe-and-drogue-type fueling apparatus. In FIG. 6, a receiving aircraft 130 includes a fuel receiving probe 140 in the forward end or nose 133 of fuselage 132. Fuel receiving probe 140 may be withdrawn within a cavity 142 when receiving aircraft 130 is not engaged in fueling operations. Fuel receiving probe 140 is manipulated between a stored orientation within cavity 142 and a fueling position (shown in FIG. 6) using a deploying mechanism 144. A probe storage cover 146 is preferably affixed with fuel receiving probe 140 to effectively cover or seal cavity 142 when fuel receiving probe 140 is in its stowed orientation within cavity 142. An identifying indicia embodied in an RFID tag 150 may be affixed within cavity 142, as shown in FIG. 6. Alternatively, tag 150 may be affixed to fuel receiving probe 140, to probe storage cover 146, to fuselage 132, to nose 133 or elsewhere, preferable substantially adjacent to fuel receiving probe 140. Fuel receiving probe 140 is configured for insertion within drogue coupler 124 (FIGS. 4 and 5) by maneuvering receiving aircraft 130 for receiving fuel from delivering aircraft 100 via delivery hose 122, drogue coupler 124 and fuel receiving probe 140 during fueling operations. Fuel receiving probe 140 is in fluid communication with fuel tanks situated within fuselage 132 (not shown in FIG. 6).

Figure 7:
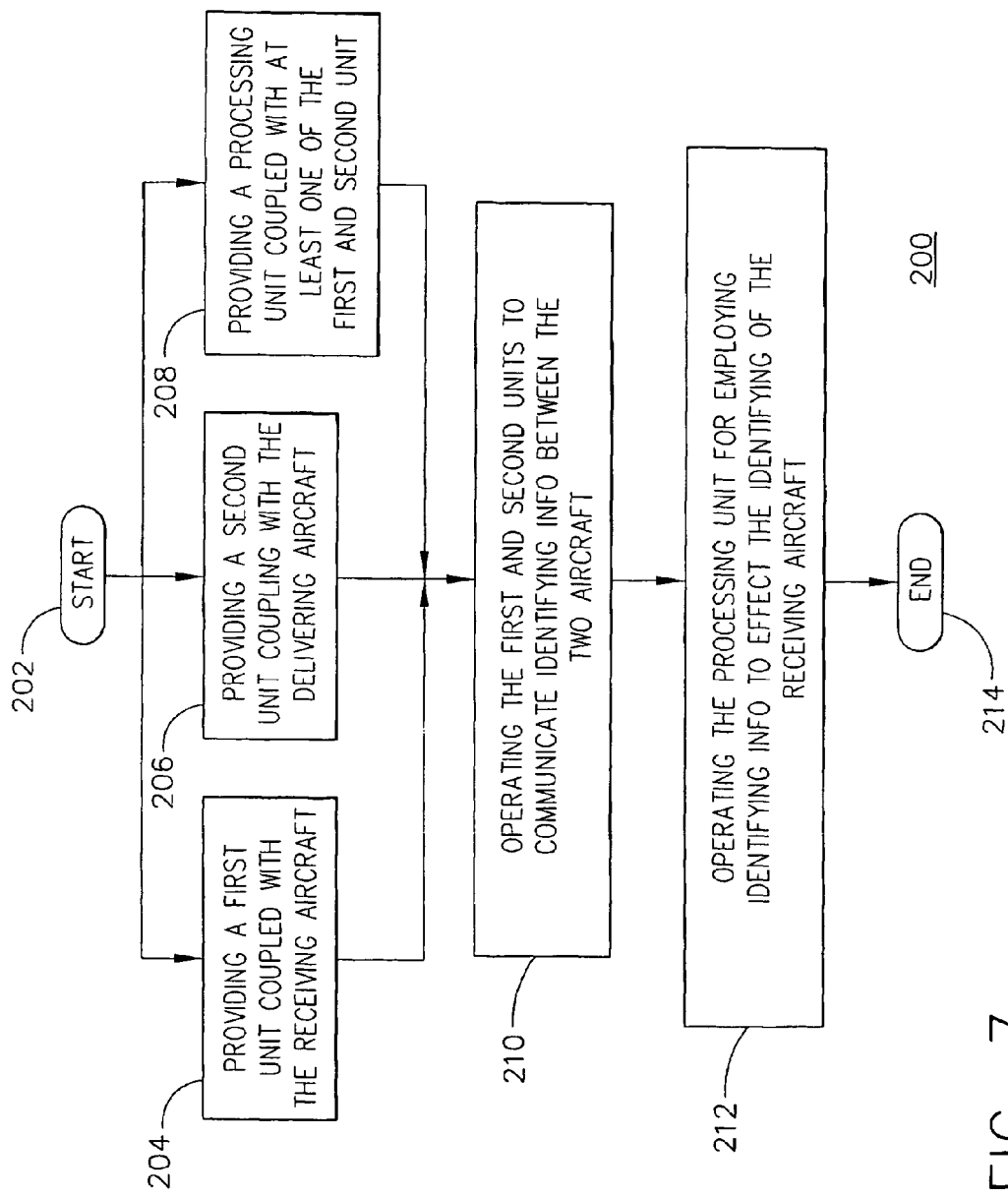
FIG. 7 is a flow chart illustrating the method of the present invention.

FIG. 7 is a flow chart illustrating the method of the present invention. In FIG. 7, a method 200 for effecting automatic identifying of a receiving aircraft receiving fuel from a fuel delivery apparatus in a delivering aircraft during an airborne fueling operation begins at a START locus 202. Method 200 continues with, in no particular order: (1) Providing a first unit coupled with the receiving aircraft, as indicated by a block 204. (2) Providing a second unit coupled with the delivering aircraft, as indicated by a block 206. (3) Providing a processing unit coupled with at least one of the first unit and the second unit, as indicated by a block 208.

Method 200 continues by operating the first unit and the second unit cooperatively to effect communicative coupling for conveying identifying information between the receiving aircraft and the delivering aircraft, as indicated by a block 210. Method 200 continues by operating the processing unit cooperatively with at least one of the first unit and the second unit for employing the identifying information to effect the identifying, as indicated by a block 212. Method 200 terminates at an END locus 214.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for accounting for fueling of a receiving aircraft during airborne fueling of said receiving aircraft by a delivering aircraft; the system comprising:
   (a) at least one identifying indicia affixed with said receiving aircraft; said at least one identifying indicia uniquely indicating individual identity of said receiving aircraft;
   (b) at least one identity recognizing unit associated with said delivering aircraft; said at least one identity recognizing unit automatically recognizing data provided by said at least one identifying indicia within a predetermined distance;
   (c) a processing unit associated with at least one of said delivering aircraft and said receiving aircraft; said processing unit cooperating with said at least one recognizing unit to ascertain said individual identity during said airborne fueling;
   (d) a fueling apparatus coupled with said processing unit; said fueling apparatus providing information to said processing unit indicating an amount of fuel provided to said receiving aircraft during said airborne refueling; said fueling apparatus and said processing unit cooperating to accumulate information in a predetermined form to automatically record said amount of fuel in association with and said individual identity; and
   (e) a fuel receiving structure via which said receiving aircraft is coupled with said fueling apparatus while receiving fuel, said fuel receiving structure is repositionable so as to present a more aerodynamic profile when not engaged in a fueling operation; said identifying indicia being affixed proximate said fuel receiving structure so as to be exposed for interrogation by said identity recognizing unit during the fueling operation and to be disposed in a protected environment when not engaged in the fueling operation.

2. A system for accounting for fueling of a receiving aircraft during airborne fueling of said receiving aircraft by a delivering aircraft as recited in claim 1 wherein said fuel receiving structure is closed when said receiving aircraft is not engaged in a fueling operation; said identifying indicia being affixed inside said fuel receiving structure when said fuel receiving structure is closed.

3. A system for accounting for fueling of a receiving aircraft during airborne fueling of said receiving aircraft by a delivering aircraft as recited in claim 1 wherein said processing unit includes a data port configured for downloading information related to said fueling.

4. A system for accounting for fueling of a receiving aircraft during airborne fueling of said receiving aircraft by a delivering aircraft as recited in claim 1 wherein said processing unit is situated in said receiving aircraft; said processing unit being coupled with said at least one recognizing unit and with said fueling apparatus during said airborne refueling operation.

5. A system for accounting for fueling of a receiving aircraft during airborne fueling of said receiving aircraft by a delivering aircraft as recited in claim 1 wherein said processing unit is situated in said delivery aircraft.

6. A system for accounting for fueling of a receiving aircraft during airborne fueling of said receiving aircraft by a delivering aircraft as recited in claim 1 wherein said processing unit includes a data port configured for downloading information related to said fueling.

7. A system for accounting for fueling of a receiving aircraft during airborne fueling of said receiving aircraft by a delivering aircraft as recited in claim 1 wherein said processing unit is situated in said receiving aircraft; said processing unit being coupled with said at least one recognizing unit and with said fueling apparatus during said airborne refueling operation.

8. A system for accounting for fueling of a receiving aircraft during airborne fueling of said receiving aircraft by a delivering aircraft as recited in claim 1 wherein said processing unit is situated in said delivery aircraft.

9. A system for accounting for fueling of a receiving aircraft during airborne fueling of said receiving aircraft by a delivering aircraft as recited in claim 6 wherein said processing unit is situated in said delivery aircraft.

10. A system for accounting for fueling of a receiving aircraft during airborne fueling of said receiving aircraft by a delivering aircraft as recited in claim 1 wherein the fuel receiving structure comprises a fuel receiving probe configured to close or be retracted within the receiving aircraft when not engaged in the fueling operation.

11. A system for accounting for fueling of a receiving aircraft during airborne fueling of said receiving aircraft by a delivering aircraft as recited in claim 10 wherein the identifying indicia is located on the fuel receiving probe.

12. A system for accounting for fueling of a receiving aircraft during airborne fueling of said receiving aircraft by a delivering aircraft as recited in claim 10 wherein the identifying indicia is located within the fuel receiving probe.

13. A system for accounting for fueling of a receiving aircraft during airborne fueling of said receiving aircraft by a delivering aircraft as recited in claim 1 wherein the fuel receiving structure is configured to withdraw into a cavity defined by the receiving aperture when not engaged in the fueling operation, and wherein the identifying indicia is located within the cavity defined by the receiving aperture during the fueling operation.

* * * * *